United States Patent [19]

Friederich

[11] Patent Number: 4,643,374

[45] Date of Patent: Feb. 17, 1987

[54] STEERING APPARATUS FOR A FLYING BODY

[75] Inventor: Oskar Friederich, Sauerlach, Fed. Rep. of Germany

[73] Assignee: Messerschmitt-Boelkow-Blohm Gesellschaft mit beschraenkter Haftung, Munich, Fed. Rep. of Germany

[21] Appl. No.: 739,825

[22] Filed: May 31, 1985

[30] Foreign Application Priority Data

Jun. 1, 1984 [DE] Fed. Rep. of Germany ....... 3420441

[51] Int. Cl.4 ............................................. B64C 15/02
[52] U.S. Cl. ...................................... 244/52; 244/76 J; 244/12.4
[58] Field of Search ......................... 244/52, 3.22, 12.5, 244/12.4, 23 D, 76 R, 76 J, 177, 178

[56] References Cited

U.S. PATENT DOCUMENTS

| | | | |
|---|---|---|---|
| 2,692,475 | 10/1954 | Hull | 244/52 |
| 2,850,977 | 9/1958 | Pollak | 244/52 |
| 2,959,378 | 11/1960 | Eggers et al. | 244/52 |
| 2,991,026 | 7/1961 | Nelson et al. | 244/52 |
| 3,065,939 | 11/1962 | Lucien | 244/52 |
| 3,096,049 | 7/1963 | Karasinski | 244/52 |
| 3,139,033 | 6/1964 | Geissler et al. | |
| 3,145,953 | 8/1964 | Denning et al. | 244/76 J |
| 3,912,202 | 10/1975 | Jenkins | 244/52 |

FOREIGN PATENT DOCUMENTS 1964205  8/1977  Fed. Rep. of Germany .
2721656 11/1978  Fed. Rep. of Germany .

Primary Examiner—Galen Barefoot
Attorney, Agent, or Firm—W. G. Fasse; D. H. Kane, Jr.

[57] ABSTRACT

The steering of a jet propelled flying body is improved by positioning jet deflector flaps into the propulsion jet for deflecting the propulsion jet. The deflector flaps can steer the flying body automatically in response to a flight control unit either alone or as a support steering system for the control surfaces of the flying body. The jet deflector flaps are arranged in the jet nozzle in a cross or star configuration and preferably near the periphery of the jet nozzle.

4 Claims, 2 Drawing Figures

STEERING APPARATUS FOR A FLYING BODY

FIELD OF THE INVENTION

The invention relates to a steering apparatus for a flying body having aerodynamic control surfaces and including a jet engine emitting a propulsion jet. The apparatus also includes means for deflecting the propulsion jet.

DESCRIPTION OF THE PRIOR ART

Such control devices are used for steering flying crafts operated or driven by a jet propulsion plant or propulsion plants and including missiles or aircraft such as drones or the like, whereby the deflection of the propulsion jet may be used for producing steering moments for steering the flying apparatus.

German Patent (DE-PS) No. 1,964,205 discloses a steering apparatus of the above mentioned type. In this German reference the propulsion jet nozzles are mounted in a tiltable manner for compensating a flight attitude deviation with the aid of a position controller which, subsequent to the nozzle tilting, adjusts the aerodynamic control surfaces while the propulsion jet nozzles are tilted back into their zero position.

However, it has been found, that this type of prior art steering mechanism is rather expensive because the tiltable mounting of the propulsion nozzles is involved and complicated on the one hand and because on the other hand the system does not provide any improvement in the flight safety of the flying apparatus.

OBJECTS OF THE INVENTION

In view of the above it is the aim of the invention to achieve the following objects singularly or in combination:

to provide a control apparatus for a flying body or the like which is capable of returning the flying body into a stable, steerable flying attitude when an unsteerable or only paritally steerable aerodynamic situation occurs suddenly;

to provide a jet deflection steering apparatus which is capable of returning the flying body into a rated or stable position relative to the pitching axis, relative to the yawing axis, and relative to the rolling axis of the flying body to thereby increase the flight safety of such flying devices while simultaneously avoiding the above mentioned disadvantages; and to provide a control for the automatic deflection of the propulsion jet in such a manner that the deflection provides a steering moment which can either completely replace the steering by the conventional control surfaces or which can effectively assist the steering moments caused by the conventional control surfaces.

SUMMARY OF THE INVENTION

The steering apparatus according to the invention is characterized in that the jet deflector flap means comprise flap members which are arranged in the propulsion jet nozzle, for example, in a crosstype or star type arrangement, whereby these jet deflector flap members are automatically driven by a respective drive member in response to a control unit for influencing the pitching motion, the yawing motion, and the rolling motion of the flying body in such a manner that the jet deflector flap members either assist the control moments exerted by the aerodynamic control surfaces of the flying body or take over the function of the aerodynamic control surface when the latter should fail.

BRIEF DESCRIPTION OF THE DRAWINGS:

The invention will be described in more detail by way of example with reference to the accompanying drawings, wherein.

DETAILED DESCRIPTION OF PREFERRED EXAMPLE EMBODIMENTS AND OF THE BEST MODE OF THE INVENTION

Figure 1:
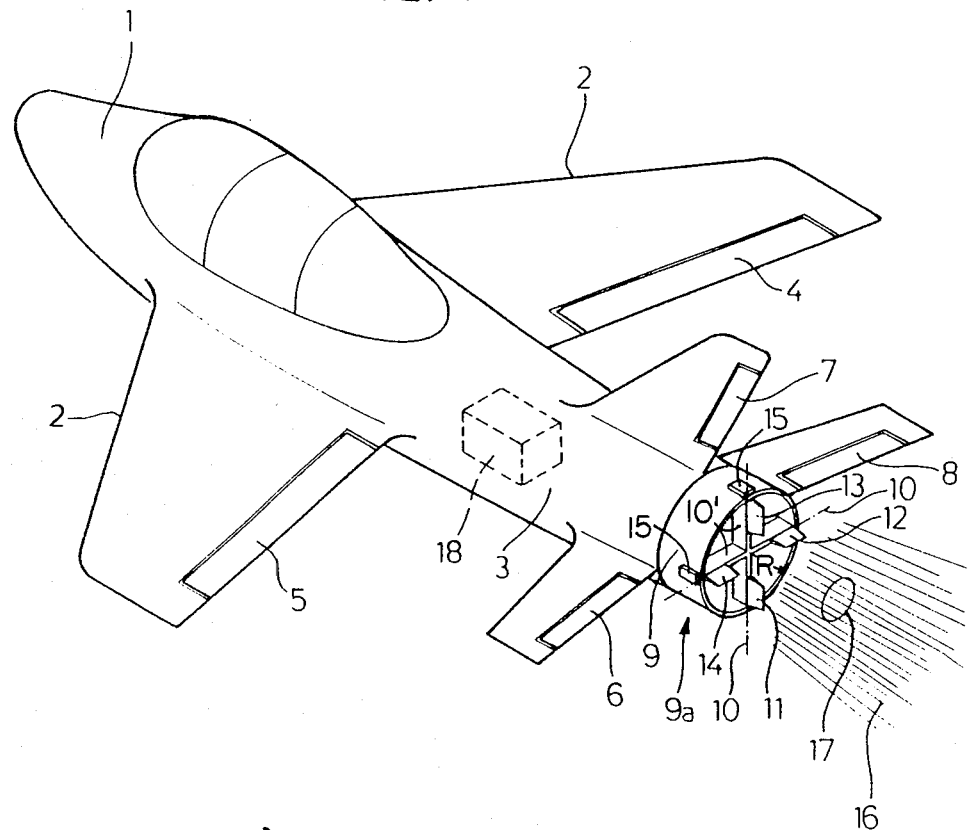
FIG. 1 is a perspective view of a flying apparatus having aerodynamic control surfaces on the wings and on the tail assembly, and which is further equipped with jet deflector flap members secured inside the nozzle in a cross- or star-shaped configuration.

FIG. 1 shows a flying body 1 having wings 2 and a tail assembly 3. The wings carry aerodynamic control surfaces 4 and 5. The tail assembly carries aerodynamic control surfaces 6, 7, and 8. These aerodynamic control surfaces are referred to simply as control surfaces herein. A propulsion jet nozzle 9 is mounted centrally to the rear of the tail assembly 3. The nozzle 9 is equipped according to the invention with an apparatus 9a comprising four jet deflection flap members 11, 12, 13, and 14 which are tiltable about respective longitudinal axes 10 extending horizontally and vertically as shown. The jet deflection flap members 11, 12, 13, and 14 are operable by conventional drive members 15 such as piston cylinder drives or the like.

As shown, the flap members 11, 12, 13, and 14 are arranged in a cross- or star-shaped configuration with a spacing of 90° between adjacent flaps. However, it is also possible to use, for example, only three flaps such as 12, 13, and 14 and to space these three flaps at 120° between adjacent flaps.

In any event, it is possible to control the propulsion jet 16 in several ways. On the one hand it is possible to deflect the propulsion jet 16 of a jet engine not shown ,relative to the required axial directions for causing or counteracting the above mentioned motions about the pitching, yawing, and rolling axes. On the other hand it is possible to simultaneously operate all flaps, for example, in the clockwise direction to thereby impart on the propulsion jet 16 a spin or angular momentum for producing control moments causing a rolling motion of the flying body 1, in the given example, in a counterclockwise direction.

The jet deflection flap members 11, 12, 13, and 14 are so dimensioned that their length in the direction of the respective longitudinal axis 10 corresponds only to about 50 to 66% of the radius R of the propulsion nozzle 9. This feature has the advantage that the flaps themselves are located outside the hot core 17 of the propulsion jet 16, whereby the useful life of these flaps is substantially increased and the danger of damage to the flaps is substantially reduced. It has been found that the propulsion jet 16 has a substantially lower temperature in the peripheral zone as compared to the core 17. The particular mounting of the flaps 11, 12, 13, and 14 to their axes 10 may comprise conventional means and this also applies to the control unit 18. Suffice it to say, that the flaps are, for example, mounted to a cross bar 10' rigidly secured in the propulsion nozzle 9. However, it is also possible to mount each flap on its own mounting bracket so that the center or core of the jet remains entirely unobstructed.

Figure 2:
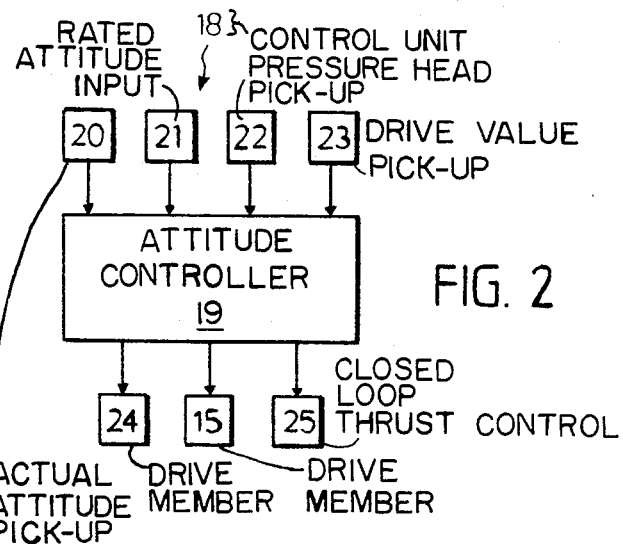
FIG. 2 is a block diagram of the control unit and drive members for the present jet deflector flaps.

FIG. 2 illustrates a block diagram of the electronic control unit 18 comprising a position or attitude controller 19 which in turn comprises in a conventional manner an actual attitude pick-up 20, a rated attitude input 21, a pressure head pick-up 22, such as a Pitot tube, and a drive value pick-up 23 for the control or steering of the control surfaces 4, 5, 6, 7, and 8 by means of a respective drive member 24, such as piston cylinder members. In other words, signals provided by the drive value pick-up are conventionally processed for operating the drive members 24 and thus the control surfaces 4, 5, 6, 7, and 8. The drive value pick-up serves for ascertaining the angle of attack of the flying body and the limit value of the angle of attack displacement of the control surfaces 4 to 8. This drive value pick-up 23 may also be constructed in a conventional manner for measuring the instantaneous adjustment or drive forces relative to the permissible drive forces for the control surfaces 4 to 8, whereby the respective signals are supplied for processing to the attitude controller 19 which in turn provides the drive signals to the drive members 24.

The attitude controller 19 also provides output control signals for the drive members 15 for the jet deflection flaps 11, 12, 13, and 14 as well as to a closed loop control device 25 for regulating the jet propulsion thrust as is conventional.

The apparatus according to the invention operates as follows. The attitude controller 19 of the control unit 18 performs a continuous signal comparing between the values representing a rated attitude as provided by the rated attitude input or memory 21 and the signals measured by the actual attitude pick-up 20. If such comparing shows that the steering or control moments producible by the control surfaces 4, 5, 6, 7, and 8 are not sufficient any longer for controlling or regulating the flying body 1 from its actual attitude into the rated attitude, then an automatic compensation signal is produced by the attitude controller 19 for controlling the jet deflection flaps 11, 12, 13, and 14 into a respective angle of attack position to thereby generate the required compensation steering or control moments by the deflection of the propulsion jet 16.

When the effectiveness of the control surfaces 4, 5, 6, 7, and 8 is totally lost, for example, when a respective component becomes inoperable or when a stalling flight condition occurs, it is possible that the entire steering function for the flying body 1 is taken over by the jet deflection flaps 11, 12, 13, and 14. Simultaneously, or additionally, it is possible, to perform rapid flight maneuvers by employing the jet deflection flaps 11, 12, 13, and 14 in addition to the control surfaces, provided that these control surfaces are still operable.

The steering of the flying body 1 with the control unit 18 involves a continuous supply of information to the attitude controller. The information includes the instantaneous angle of attack position as measured by the drive value pick-up 23 and/or information regarding the adjustment or drive forces for the control surfaces 4, 5, 6, 7, and 8 as measured by a respective drive value pick-up. This information also includes the value of the pressure head as measured by the pick-up 22. The attitude controller ascertains the instantaneously required steering control effectiveness with reference to a predetermined or given steering moment curve or characteristic which is dependent on the pressure head for steering the flying body 1 from its measured actual position into the rated position. When it occurs that the steering effectiveness of the control surfaces 4 to 8 is insufficient or even missing, then the flaps 11, 12, 13, and 14 are automatically activated through their respective drive members 15 to such an extent relative to the propulsion jet 16 that due to the resulting jet deflection the sum of the required steering moments will correspond to the predetermined control moment characteristic for the required rated attitude of the flying body 1.

The closed loop thrust control 25 enables the attitude controller 19 to also provide a compensation when the steering effect of the jet deflection flaps 11, 12, 13, and 14 is insufficient. In this instance the propulsion thrust selected by the pilot or autopilot is automatically increased through the closed loop thrust control 25 to thereby increase the steering effectiveness of the propulsion jet deflection either by itself or in combination with the control surfaces 4 to 8, whereby again the actual steering moment curve or characteristic is brought to conform to the predetermined steering moment characteristic corresponding to the rated attitude of the flying body 1.

The advantages of the invention are seen, particularly in the fact that the flying body can be controlled in a simple and safe manner even if the body is aerodynamically not controllable any more or only partially controllable in an aerodynamical manner, whereby the auxiliary or substitute control according to the invention is provided automatically in a way that leads at any time to a steerable and controllable flight condition while utilizing a substantial excess of steering capacity. This feature yields a substantial safety factor which in turn contributes essentially to flight safety.

The foregoing means, that the additional or main steering provided according to the invention is especially available in emergency situations, for example during a critical landing situation of the aircraft which is thus provided with substantial and automatic, as well as rapidly reacting steering and control or closed loop control reserves for all flight axes. Additionally, it is now possible to utilize the excess thrust which becomes available due to the low thrust requirement during a landing operation, for further additional control purposes during flight conditions as well as on the ground when the aircraft is rolling on the runway.

Although the invention has been described with reference to specific example embodiments, it will be appreciated, that it is intended to cover all modifications and equivalents within the scope of the appended claims.

What I claim is:

1. A steering system for a flying body, comprising aerodynamic control surfaces (4, 5, 6, 7, 8) operable for steering said flying body, jet engine means for emitting a propulsion jet, jet deflector flap means (11, 12, 13, 14), means mounting said jet deflector flap means in said propulsion jet for deflecting said propulsion jet, flight condition pick-up means for providing flight condition signals, flight control means (18) including attitude controller means (19) having input means connected to said flight condition pick-up means for receiving said flight condition signals, whereby said attitude controller means receive a continuous supply of actual flight information, said jet deflector flap means being arranged for controlling a pitching motion, a yawing motion, and a rolling motion of said flying body by a respective deflection of said propulsion jet, said system further comprising drive means (15) connected to said jet deflector flap means (11, 12, 13, 14), means connecting said drive means (15) to said flight attitude controller means (19) for operating said jet deflector flap means to assist or replace said aerodynamic control surfaces (4, 5, 6, 7, 8) in response to said flight condition signals, wherein said flight condition pick-up means comprise a pressure head measuring device for supplying a pressure head input signal to said flight control means, memory means having stored therein a rated, pressure head dependent control momentum curve providing rated attitude representing control moment values to said flight control means for controlling said jet deflector flap means in such a manner, that the sum of actual control moments provided by said jet deflector flap means (11, 12, 13, 14) and of actual control moments provided by said aerodynamic control surfaces (4, 5, 6, 7, 8) corresponds to said rated, pressure head dependent control momentum curve, whereby said flight attitude controller means (19) ascertains the instantaneously required steering control effectiveness with reference to said rated, pressure head dependent control momentum curve for steering said flying body from its measured actual attitude into a rated attitude determined by said rated, pressure head dependent control momentum curve, and whereby said sum of actual control moments can be supplied by said aerodynamic control surfaces or by said jet deflector flap means or by said aerodynamic control surfaces and said jet deflector flap means to satisfy said rated, pressure head dependent control momentum curve, said system further comprising a closed loop thrust control device (25) connected to said flight control means and to said jet engine for automatically controlling the jet engine thrust in a closed loop manner to increase the steering effect of said jet deflector flap means (11, 12, 13, 14), when the steering effect of said jet deflector flap means becomes insufficient for satisfying said rated, pressure head dependent control momentum curve at all flight speeds.

2. The apparatus of claim 1, wherein said jet deflector flap means comprise three jet deflector flap members arranged in a star configuration, said drive means for said jet deflector flap means having respective drive members connected to said jet deflector flap members for operating said jet deflector flap members to cause said flying body to perform a pitching motion, a yawing motion, and a rolling motion singly or in combination.

3. The apparatus of claim 1, wherein said jet deflector flap means comprise four deflector flap members arranged in a cross configuration, said drive means for said jet deflector flap means having respective drive members connected to said jet deflector flap members for operating said jet deflector flap members to cause said flying body to perform a pitching motion, a yawing motion, and a rolling motion singly or in combination.

4. The apparatus of claim 1, wherein said jet engine has a given nozzle radius, said jet deflector flap means having a length corresponding to about 0.5 to 0.66 times said given nozzle radius, said mounting means of said jet deflector flap means locating said jet deflector flap means in said propulsion jet in positions close to a periphery of said propulsion jet away from a hot core of said propulsion jet for increasing the operational life of said jet deflector flap means.

* * * * *